United States Patent [19]
Carlson

[11] 3,852,614
[45] Dec. 3, 1974

[54] DUAL-MODE SECURITY CIRCUIT FOR AUTOMOTIVE VEHICLES AND THE LIKE

[75] Inventor: Paul A. Carlson, New Providence, N.J.

[73] Assignee: Wagner Electric Corporation, Parsippany, N.J.

[22] Filed: Nov. 23, 1973

[21] Appl. No.: 418,683

[52] U.S. Cl. .............. 307/10 AT, 180/114, 340/63
[51] Int. Cl. ............................................. H02g 3/00
[58] Field of Search ........ 307/10 R, 10 AT; 340/63, 340/64; 180/114, 112

[56] References Cited
UNITED STATES PATENTS
3,723,967  3/1973  Atkins et al. .................. 307/10 AT

*Primary Examiner*—Robert K. Schaffer
*Assistant Examiner*—M. Ginsburg
*Attorney, Agent, or Firm*—Eyre, Mann & Lucas

[57] ABSTRACT

A security circuit electronically switchable between a first (key) mode in which the engine starting circuit may be activated by means of a mechanically-keyable switch alone, and a second (security) mode in which the activation of the engine starting circuit may be carried out within a predetermined period of time by means of a mechanically-keyable switch only after a predetermined signal has been provided to the security circuit in response to an electronic key. The security circuit is also operative to open the vehicle door locks in response to the electronic key, and will subsequently reclose all of the locks if the vehicle is not entered within a predetermined period of time. When the operator gains entry to the vehicle by means of the electronic key, all of the vehicle doors will be automatically locked when the operator closes the door through which he entered.

32 Claims, 2 Drawing Figures

Fig. 1.

DUAL-MODE SECURITY CIRCUIT FOR AUTOMOTIVE VEHICLES AND THE LIKE

CROSS-REFERENCE TO RELATED APPLICATION

The system disclosed herein may advantageously incorporate the keying circuit/keyable control circuit disclosed and claimed in U.S. Patent No. 3,842,324 issued on Oct. 15, 1974 upon application Ser. No. 301,438 entitled INDUCTION-KEYED CONTROL CIRCUIT WITH KEYING NETWORK HAVING VARIABLE RESONANT FREQUENCY filed on Oct. 27, 1972 in the name of Carl E. Atkins.

BACKGROUND OF THE INVENTION

The theft of automotive vehicles is a continuing and increasing social menace. A wide variety of approaches, systems and devices have been formulated and devised in an attempt to solve the problem of deterring or preventing automobile theft. As automotive technology advances, the automobiles produced in succeeding model years incorporate increasingly sophisticated, adaptive and complex means for deterring or preventing automotive theft. However, to applicant's knowledge no system has been devised which affords a high degree of security for an unattended automobile, and a reduced degree of security for an attended automobile, e.g., one which has been parked in a guarded parking lot.

The present invention relates to a dual-mode security circuit which may advantageously be employed, for example, in a system for controlling access to the interior of a vehicle and subsequent actuation of the vehicle engine. This control circuitry may readily be incorporated into an automobile during its manufacture, or may be readily retrofitted to an existing, older automobile. The circuit which embodies the present invention is designated to be cooperatively interconnected to existing elements of an automobile vehicle, including the ignition switch, starter solenoid, one or more door unlocking motors or solenoids, and one or more door switches. Various input signal are derived from the mechanically-keyable ignition switch, door switch, and a keyable control circuit preferably of the type disclosed in the cross-referenced application. Depending upon the occurrence and sequence of the various input signals, the security circuit will function in either the security mode or in the key mode. In the security mode, the circuit will respond only to a signal from the electronically-keyable control circuit to unlock the vehicle doors, and will respond to actuation of the mechanically-keyable ignition switch within a predetermined period of time to activate the engine starting circuit. In the key mode, the circuit is disabled from performing its door locking/unlocking functions, and the engine starting circuit may be activated by a mechanical ingition key alone.

SUMMARY OF THE INVENTION

The present invention is embodied in and carried out by dual-mode security circuit which is electronically switchable between a security mode and a key mode. In the security mode, access to the associated vehicle may be gained only by means of an electronic key which causes unlocking of the vehicle doors and enables the engine starting circuit to be closed within a predetermined period of time by means of a mechanical key. Upon entry into the vehicle and subsequent closing of the door, all doors are automatically locked. If the vehicle is not entered within a predetermined period of time after use of the electronic key, the vehicle doors will be automatically relocked.

To switch to the key mode, the operator has only to open one door and then employ his electronic key. Thereafter, the vehicle may be entered and the engine starting circuit closed by means of a mechanical key along. To switch back to the security mode, the operator has only to use his electronic key again.

BRIEF DESCRIPTION OF THE DRAWINGS

The present invention may be better understood by reading the written description thereof with reference to the accompanying drawings, of which.

DESCRIPTION OF THE PREFERRED EMBODIMENT

Figure 1:
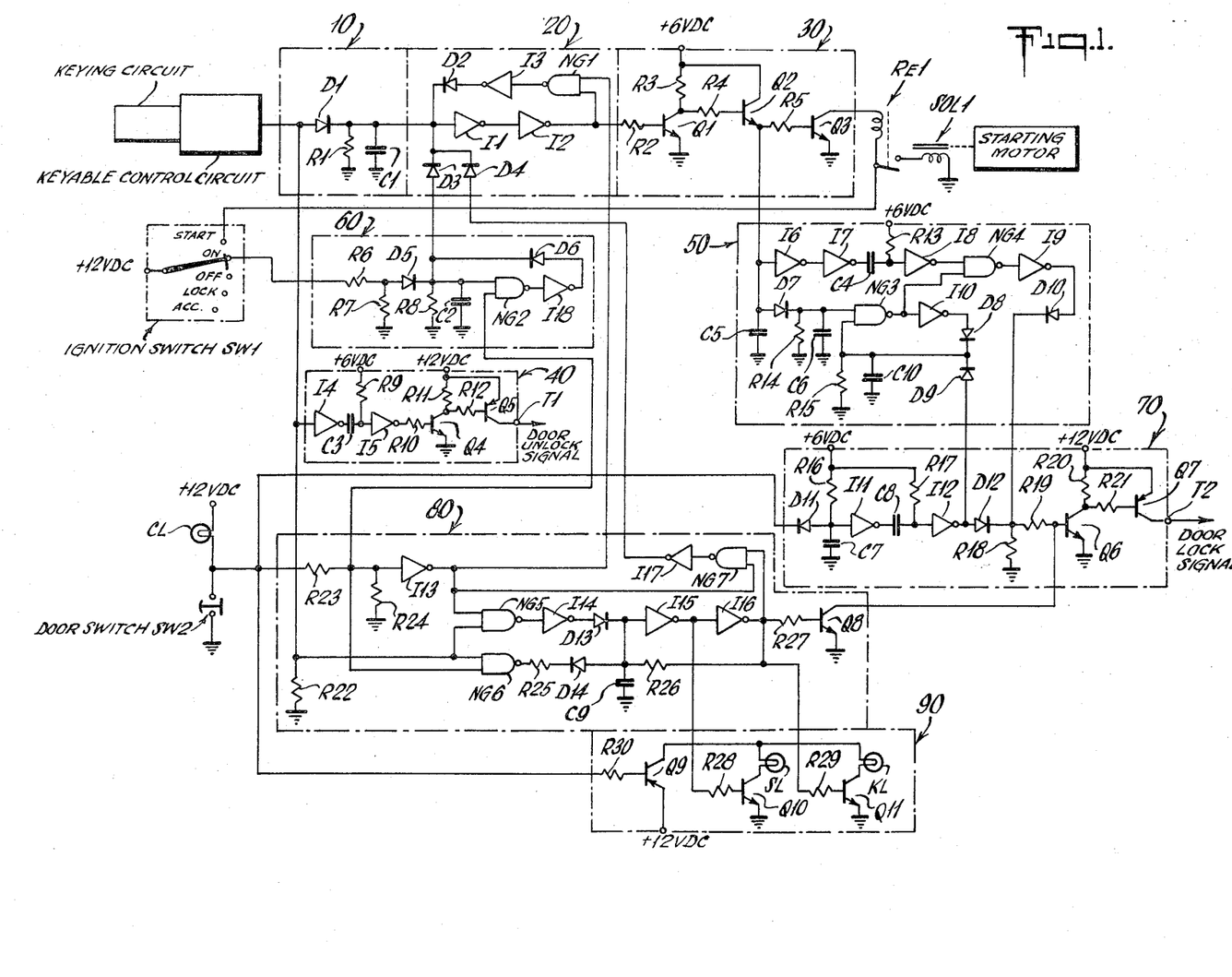
FIG. 1 is a schematic circuit diagram of the circuit embodying the present invention, shown in its operative connection to existing components of an automotive vehicle.
Figure 2:
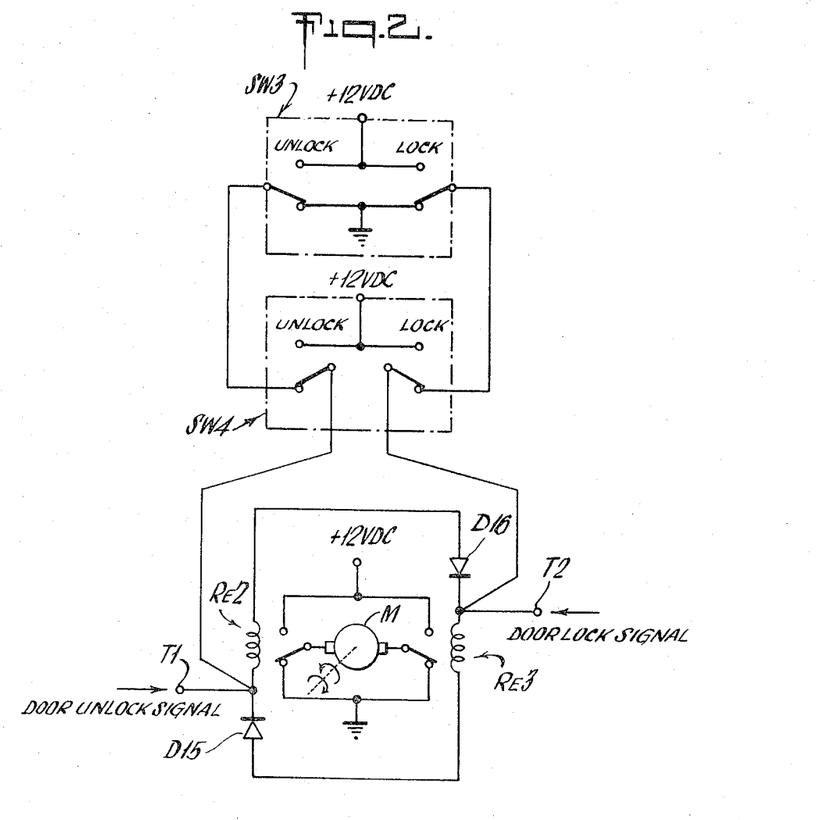
FIG. 2 is a schematic circuit diagram of the circuitry for controlling the energization of a reversible motor, which may be employed to open or close a door lock.

Referring generally to the system shown in FIGS. 1 and 2, the dual-mode security circuit included therein comprises memory circuit 10, memory latching circuit 20, driver circuit 30, unlock circuit 40, relock circuit 50, ignition latching circuit 60, locking circuit 70, mode selector circuit 80 and mode indicator circuit 90. The general outline of the operator of applicant's dual-mode security circuit is as follows: With the circuit in its security mode, which is normally the case, the coupling of a keying circuit to the keyable control circuit will cause unlocking of the vehicle doors. At least one door, preferably the door affording access to the driver's position, must then be opened within a predetermined period of time (e.g., 30 seconds) or else all the doors will be relocked. If at least one door is opened and reclosed within the aforementioned time period, all doors are automatically locked and the vehicle operator has a predetermined period of time (about 30 seconds) from the closing of the last door within which to insert the mechanical key into the ignition switch and rotate the ignition switch to the START position. If the vehicle operator fails to perform this operation within the predetermined period of time, he must again provide the input pulse generated by the keyable control circuit by coupling the keying circuit thereto. Multiple stations both interior and exterior to the vehicle may be provided for this purpose, so that it will not be necessary for the operator to exist from the vehicle to repeat this step. If the operator does actuate the ignition switch to the START position within the predetermined period of time, the engine is started and the vehicle may thereafter be operated in the normal manner. When the operator stops the vehicle and shuts off the engine by turning the ignition switch to the OFF position, the engine may be restarted for an indefinite period of time. When the operator opens a vehicle door to exit from the vehicle, and subsequently closes the vehicle door, all vehicle doors are automatically locked, and within a predetermined period of time (e.g., 30 seconds) from the closing of the door, the power or ignition circuit of the vehicle is disabled. Thus, if the operator changes his mind about stopping and decides to drive on, he may do so without employing his keying circuit either before he opens the door to exit, or after he opens the door to exit whether he exits or not, or within 30 seconds from opening the door and closing it with or without exiting.

If the operator wishes to allow another person such as a parking lot attendant to operate the vehicle, but does not wish to provide such person with the article of jewelry incorporating the electronic keying circuit which enables entry into and operation of the vehicle when the security circuit is in the security mode, he may cause the security circuit to switch to the key mode by opening a door and subsequently coupling the keying circuit to the keyable control circuit before closing the door. Thereafter, the security circuit is, in net effect, inoperative; only the mechanical key is necessary to enter and operate the vehicle. In this key mode, the doors do not automatically lock upon closing. To switch the dual-mode security circuit back to the security mode, the vehicle operator has only to couple the keying circuit to the keyable control circuit.

Referring now specifically to FIG. 1 combined with FIG. 2, when the keyable control circuit generates a control signal in the form of a positive output pulse in response to the coupling of an electronic keying circuit thereto, this positive pulse is applied as an input to memory circuit 10. Consequently, capacitance C1 is rapidly charged through diode D1, and the voltage across C1 remains at substantially the peak value of the input pulse for the duration of that pulse. The only effective discharge path for capacitance C1 is through parallel resistance R1. Although such discharge is initiated upon the termination of positive output pulse from the keyable control circuit, in the ordinary course of events the voltage across C1 will not fall below the threshold voltage of inverter I1 between the termination of the positive input pulse and the actuation of the memory latching circuit 20. The latter step will be described further on in this specification.

The voltage developed across capacitance C1 in the memory circuit 10 is applied to memory latching circuit 20, causing the normally-high output of inverter I1 to go low, with the result that the normally-low output of inverter I2 goes high. This high output is applied to the input of driver circuit 30, i.e., through resistance R2 to the base of transistor Q1, causing Q1 to become conductive. In its conductive state, transistor Q1 allows the flow of turn-on current across the emitter-base junction of transistor Q2 through resistance R4 and the collector-emitter junction of Q1, thereby causing Q2 to become conductive. As a result, transistor Q3 is rendered conductive by the flow of current through the emitter-collector junction of Q2 and through resistance R5 across the base-emitter junction of Q3. One terminal of the winding of relay RE1 is thus grounded through the collector-emitter junction of Q3, thereby enabling engine start-up by the application of source voltage through ignition switch SW1 to the other terminal of the winding.

The positive output pulse generated by the keyable control circuit is also fed to the door unlocking circuit 40, thus causing the normally-high output of inverter I4 to go low. This low voltage at the output of inverter I4 is instantaneously transmitted through capacitance C3 to the input of inverter I5, the output of which goes high as a result. The high output of inverter I5 is fed through resistance R10 to the base of transistor Q4 which is consequently rendered conductive. Turn-on current is thus allowed to flow across the emitter-base junction of transistor Q5 and through resistance R12 and the collector-emitter junction of transistor Q4. Thus, the collector of transistor Q5 rises to approximately source voltage virtually instantaneously with the initiation of the positive output pulse from the keyable control circuit, thereby energizing the door lock/unlock motor M so that it rotates in a first direction to unlock the associated door. This period of conductivity of transistor Q5 is determined by the time it takes capacitance C3 to become charged through resistance R9 to the threshold voltage to which inverter I5 responds. When this occurs, the output of inverter I5 returns to its normally-low voltage level, thereby causing transistors Q4 and Q5 to become non-conductive. In this fashion, the duration of the output pulse appearing at terminal T1 of door unlocking circuit 40 can be no longer than the duration of the positive output pulse generated by the keyable control circuit.

When the vehicle operator enters the vehicle, normally-open door switch SW2 is closed by opening the door through which entry is made, and is reopened by the subsequent of that door. Thus, an energization current path for courtesy light CL is completed during the period of closure of switch SW2, and the input of inverter I13 goes low. Consequently, the output of inverter I13 goes high, thereby providing one input to NAND gate NG1 in memory latching circuit 20. The other input to NAND gate NG1 has been provided by the high output of inverter I2, which lasts as long as the voltage across capacitance C1 in memory circuit 10 remains above the threshold voltage to which inverter I1 responds. With these two high inputs, the output of NAND gate NG1 goes low, thereby causing the output of inverter I3 to go high. This high output is applied through diode D2 (1) to the high side of memory capacitance C1, thereby maintaining C1 in its charged state, and (2) to the input terminal of inverter I1, causing the output of inverter I2 to remain high as long as door switch SW2 is open, i.e., while the vehicle door through which the operator entered is open. Since the driver circuit 30 enables energization of the engine starting circuit as long as the input received from memory latching circuit 20 is high, the operator may start the engine any time after entering and before closing the door. When the operator closes the door, thereby reopening door switch SW2 and placing the input of inverter I13 at a high potential through courtesy lamp CL and resistance R23, the output of inverter I13 again goes low, thereby removing one of the necessary inputs from NAND gate NG1, the output of which again goes high. Consequently, the output of inverter I3 goes low, thereby allowing capacitance C1 in memory circuit 10 to initiate its discharge through resistance 41. It is this discharge, initiated by the closing of the vehicle door, that determines the duration of the predetermined period of time within which energization of the engine starting circuit may be effected by actuation of the mechanically-keyable, multiple-position ignition switch SW1 to the START position. Preferably, this time period is on the order of 30 seconds. The use of the inverters I1 and I2 is intended to limit the discharge path of C1 through resistance R1; with a larger capacitance C1, these inverters could be eliminated.

Upon actuation of ignition switch SW1 through the ON position to the START position within the aforementioned predetermined period of time, full source voltage is applied (1) through the armature, its arcuately-extended tip, and the ON terminal to ignition latching circuit 60, and (2) through the armature and START terminal to the undergrounded terminal of the winding of relay RE1. As previously described, the other terminal of that winding has been connected to ground through the collector-emitter junction of transistor Q3 from the initiation of the control signal generated by the keyable control circuit in response to the electronic keying circuit until the termination of the aforementioned predetermined period of time within which the voltage across capacitance C1 in memory circuit 10 is higher than the threshold voltage of inverter I1. Consequently, relay RE1 is energized, thereby causing engagement of its armature and contact and energization of starter solenoid SOL1 through ignition switch SW1 and the armature and contact of relay RE1. After the engine has been started, the armature of ignition switch SW1 is moved from the START position to the ON position, thereby de-energizing relay RE1.

The source voltage applied through the armature and ON contact of ignition switch SW1 to ignition latching circuit 60 is divided across resistances R6 and R7. The voltage at the junction of R6 and R7 is applied through diode D5 and the filtering network formed by resistance R8 and capacitance C2 to provide one input to NAND gate NG2. The other input to NG2 is provided by the voltage appearing at the junction of resistances R23 and R24 when the door switch SW2 is open, i.e., when the associated door is closed. With both necessary inputs thus being fed to NAND gate NG2, its normally-high output goe low, thereby causing the output of inverter I18 to go high. Thus, during the normal operation of the vehicle when both of the inputs to NAND gate NG2 are high, the ignition latching circuit 60 will provide a high voltage through the diodes D6 and D3 to the input of inverter I1 in memory latching circuit 20, thereby enabling energization of relay RE1 in the manner previously described. In addition, the charge on memory capacitance C1 in memory circuit 10 is maintained by the high output of inverter I18. If the operator ceases operation of the vehicle and turns the armature of the ignition switch SW1 to either of the OFF, LOCK or ACCESSORY positions, the first necessary input to NAND gate NG2 is still provided by the high output of inverter I18 applied through diode D6, and the input of inverter I1 is maintained high to keep relay RE1 energizable, thus enabling restarting of the engine at any time prior to opening the door associated with door switch SW2. When the operator opens the door and thereby causes SW2 to close, one of the necessary inputs is immediately removed from NAND gate NG2, causing its output to go high. The output of inverter I18 goes low as a result, thereby removing the other necessary input from NAND gate NG2. However, sustaining voltage is now applied to capacitance C1 because the closing of door switch SW2 caused the output of I13 to go high, thereby applying the other necessary input to NG1, the output of which goes low to cause the output of I13 to go high. Thus, the voltage across C1 is maintained above the threshold voltage of inverter I1, thereby maintaining relay RE1 energizable by subsequent actuation of the ignition switch.

The lock circuiit 70 is controlled by the door switch SW2. Normally, capacitance C7 is charged, and the output of inverter I11 is low. Thus, capacitance C8 is normally charged, causing the output of inverter I12 to be normally low. Consequently, transistor Q6 has its base grounded through resistances R19 and R18. Therefore, transistor Q6, which in the security mode is not shunted by transistor Q8 in the mode selector circuit 80, is normally non-conductive, leaving the emitter and base of transistor Q7 at essentially the same potential, causing transistor Q7 to be normally non-conductive. Upon the opening of the vehicle door associated with door switch SW2, that normally-open switch is closed, thereby closing a rapid discharge path for capacitance C7 through diode D11 and switch SW2 to ground. As a result, the output of inverter I11 goes high, thereby effectively discharging capacitance C8 by placing both plates at the same potential. Since the input to inverter I12 is normally high, this has no effect on the output of inverter I12, and consequently no effect on the remainder of the circuit. However, when the operator recloses the door (after exiting the vehicle, or while remaining in the vehicle), door switch SW2 returns to its normally-open position and capacitance C7 begins to be recharged through resistance R16. After a predetermined period of time (preferably 2 seconds) determined by the values of resistance R16 and capacitance C7, the voltage developed across C7 will exceed the threshold of inverter I11, and the output of inverter I11 will again go low. This low voltage will be applied through discharged capacitance C8 to the input of inverter I12, the output of which will go high as a result. This high output of I12 is applied through diode D12 and resistance R19 to the base of transistor Q6, which is consequently rendered conductive. Thus, turn-on current for transistor Q7 may flow across the emitter-base junction of Q7, through resistance R21 and across the collector-emitter junction of Q6 to ground, thereby causing Q7 to become conductive. Consequently, essentially source voltage will appear at output terminal T2 as long as Q7 remains conductive. This period of conductivity is predetermined by selecting the values of resistance R17 and capacitance C8. Specifically, from the time the output of I11 returns to its normally-low level until capacitance C8 recharges to a level which exceeds the input threshold of inverter I12, the positive pulse forming the door lock signal is developed at output terminal T2. Initiation of this door lock signal may be delayed for as long or as short a period as desired after reclosing the vehicle door by the proper selection of the values of resistance R16 and capacitance C7.

Door relock circuit 50 operates to relock the vehicle doors if the operator has failed to open a vehicle door within a predetermined period of time after termination of the positive output pulse from the keyable control circuit. It will be recalled that the collector of transistor Q2 in driver circuit 30 goes high in response to application of the positive output pulse from the keyable control circuit to the memory circuit 10 and memory latching circuit 20. This high voltage at the collector of Q2 is applied to relock circuit 50 to charge capacitance C6 virtually instantaneously past a small filter capacitance C5 and through diode D7, thereby providing one necessary input to NAND gate NG3. The high collector voltage of Q2 is also applied to the input of inverter I6, thereby causing its output to go low. The normally-low output of inverter I7 therefore goes high, effectively discharging the normally-charged capacitance C4. Since the input to inverter I8 is normally high, this will cause no change in the low output of I8. If the operator fails to open the vehicle door before the voltage across capacitance C1 in memory circuit 10 falls below the input threshold of inverter I1 in memory latching circuit 20, the output of I1 returns to its normally-high voltage, causing the output of I2 to return to its normally-low voltage. Thus, transistors Q1, Q2 and Q3 in driver circuit 30 are also returned to their normally non-conductive states. The low potential now appearing at the collector of transistor Q2 causes capacitance C6 in relock circuit 50 to discharge through resistance R14, the diode D7 being operative to block the flow of discharge current through any other path. The low voltage now appearing at the input threshold of inverter I6 causes its output to return to its normally-high level, thereby causing the output of inverter I7 to go low again. This low output of I7 is applied through discharged capacitance C4 to the input of inverter I8, the output of which now goes high and remains high until C4 recharges through resistance R13 to a voltage which exceeds the input threshold of I8. During this predetermined period of time in which the output of inverter I8 is high, one necessary input is supplied to NAND gate NG4. The other necessary input to NAND gate NG4 has been supplied by the normally-high output of NAND gate NG3, which also normally causes the output of inverter I10 to be low. This low output of inverter I10 is coupled through diode D8 to the other input of NAND gate NG3 and leaves it biased low through R15. The normally-low output of inverter I12 in door lock circuit 70 is coupled through diode D9 to the other input of NG3, and also leaves that input biased low through R15. Therefore, in spite of the fact that C6 was charged to provide one necessary input to NG3, the other necessary input has not been provided and the output of NG3 remains high.

Under these circumstances, the output of NG3 goes low, causing the output of inverter I9 to go high. The high output of I9 is applied through diode D10 across resistance R18 in door lock circuit 70. The voltage thus developed across R18 is applied through resistance R19 to the base of transistor Q6, which is consequently rendered conductive and thereby enables Q7 to become conductive as previously described in connection with the operation of lock circuit 70. Thus, approximately source voltage will appear at output terminal T2 to provide a door lock signal having a duration determined by the time it takes capacitance C4 to recharge through resistance R13 to a voltage level above the input threshold of inverter I8 in relock circuit 50.

If the vehicle operator opens the door associated with door switch SW2 prior to the discharge of memory capacitance C1 to a voltage below the input threshold of inverter I1, i.e., before the driver circuit transistor Q2 switches back to its non-conductive state, the closure of door switch SW2 places the input of inverter I13 at a low potential, thereby causing its output to go high and provide one necessary input to NAND gate NG1. Since the other input to NG1 is provided by the high voltage appearing at the output of inverter I2 as long as the input to inverter I1 is held high by the voltage across memory capacitance C1, the output of NG1 goes low with the result that the output of inverter I3 goes high. This high output of I3 is applied through diode D2 to maintain the input of I1 high, and to maintain the voltage across memory capacitance C1 for as long as the door is open. The collector of transistor Q2 in driver circuit 30 is thus maintained at approximately source voltage as a result of the continuing high output of inverter I2. Consequently, relock circuit 50 remains primed to generate an output pulse which would produce a door lock signal at output terminal T2, as previously described.

When the operator then enters the vehicle and closes the door, thereby reopening door switch SW2, the door lock circuit 70 operates in the manner previously described to develop a high pulse of predetermined duration at the output of inverter I12 and a resultant door lock signal at output terminal T2. The high output pulse of I12 is also applied through diode D9 across resistance R15 and noise-filtering capacitance C10 to the other input of NAND gate NG3. Since one necessary input to NAND gate NG3 is still provided by the high collector voltage of driver circuit transistor Q2 impressed across capacitance C6, the output of NG3 goes low, thereby causing the output of inverter I10 to go high. This high output of I10 is applied through diode D8 and across R15 and C10 to latch up one input of NG3. The low output of NG3 is also applied to an input of NAND gate NG4. Since both of the inputs to NG4 are now low, its output remains high, thereby holding the output of inverter I9 low. Thus, the generation of a redundant turn-on signal to the driver portion of lock circuit 70 is prevented.

During operation of the vehicle, memory capacitance C1 in memory circuit 10 remains fully charged and memory latching circuit 20 continues to maintain a high output to driver circuit 30 due to the input from ignition latching circuit 60, as previously described. Therefore, driver circuit transistor Q2 continues to remain conductive, thereby maintaining a high input to relock circuit 50, which continues to remain primed to generate an output pulse to lock circuit 70.

After the operator has ceased operation of the vehicle, turned the ignition switch SW1 to any one of the OFF, LOCK or ACCESSORY positions, and opened and reclosed the door associated with door switch SW2, capacitance C1 in memory circuit 10 initiates its discharge. If the voltage across C1 falls below the input threshold of inverter I1 in memory latching circuit 20 before occurrence of any other event, the input to driver circuit 30 will go low, thereby causing all of the driver circuit transistors Q1, Q2 and Q3 to become non-conductive. Thus, the input to relock circuit 50 derived at the collector of Q2 goes low, thereby initiating discharge of capacitance C6 through resistance R14 and initiating recharging of capacitance C4 through resistance R13 and the now low output of inverter I7. In order to prevent generation of a superfluous door lock signal, the doors still being locked at this point in time, the values of the two RC circuits comprising C4-R13 and C6-R14 are selected so that the lower input to NAND gate NG4 is held low for a longer period of time than the upper input is driven high by the input to inverter I8. More specifically, the values of the aforementioned components are arranged so that the voltage across C6 does not fall below the input threshold of NG3 before C4 is recharged to a voltage above the input threshold of I8. It will be recalled that the other input to NG3 is latched high through inverter I10 and diode D8 across filtering network C10-R15. Thus, the output of NG3 is maintained low for at least the duration of the high output pulse appearing generating by I8 during the recharging of C4. Since NG4 has only one necessary high input, its normally high output remains high. Thus, inverter I9 is prevented from generating a high output and causing the generation of a door lock signal at terminal T2 of lock circuit 70 in the manner previously described.

The operation of the mode selector circuit 80 and the procedure for switching from the security mode to the key mode and back to the security mode will now be described. When the vehicle operator has been operating the vehicle with the security circuit in the security mode, ceases operation of the vehicle and opens the door to exit, door switch SW2 is actuated to a closed position, thereby grounding the normally-high inputs of NG6 and inverter I13. Consequently, the output of I13 goes high to provide one necessary input to each of NAND gates NG5 and NG7. With the door switch SW2 still closed, if the operator now employs his keying circuit to cause the keyable control circuit to generate an output pulse across resistance R22, another necessary input is provided to NAND gate NG5, causing its output to go low. The output of inverter I14 goes high as a result, thereby causing the output of inverter I15 to go low and the output of inverter I16 to go high. Since NAND gate NG6 has received only one necessary input, its output remains high. Thus, capacitance C9 is charged through resistance R26 by the high output at I16, thereby latching up the inverters I15 and I16 as long as the capacitance C9 remains charged. Upon termination of the control pulse from the keyable control circuit, the output of NAND gate NG5 returns to its normally-high condition, and the output of inverter I14 again goes low. Blocking diode D13 now prevents capacitance C9 from discharging through inverter I14. The second necessary input is provided to NAND gate NG7 as long as the latched condition of inverters I15 and I16 is maintained. Since the first necessary input has been provided by the high output of inverter I13, the output of NAND gate NG7 goes low, thereby causing the output of inverter I17 to go high. This high output is provided to memory latching circuit 20, and is applied through diode D4 to the input of inverter I1, which goes low and thereby causes the output of inverter I2 to go high. Thus, the driver circuit 30 maintains relay RE1 in an energizable condition as long as the output of I17 is high, thereby enabling engine start-up by actuation of ignition switch SW1. The high output of inverter I17 also maintains the charge across capacitance C1 in memory circuit 10. The latched high output of I16 is also applied through resistance R27 to the base of transistor Q8, which is thereby switched to a conductive state to shunt the input to the driver portion of door lock circuit 70. Thus, door lock circuit 70 is prevented from generating a door lock signal at output terminal T2 in response to any input from the door switch SW2 or from relock circuit 50 as previously described.

When the operator has thus completed the switching of the dual-mode security circuit to the key mode, he may exit the vehicle and close the door, thereby deactuating door switch SW2 to its normally-open condition. This causes the input of inverter I13 to return to its normally-high state, and its output again goes low. Thus, one necessary input is removed from NAND gate NG7 and its output goes high, causing the output of inverter I17 to go low. Thus, discharge of capacitance C1 in memory circuit 10 is enabled a person with only the mechanical key associated with ignition switch SW1 may nevertheless subsequently enter and operate the vehicle. As previously described, the automatic door lock circuit 70 has been disabled by transistor Q8. When the vehicle door is subsequently opened, inverter I13 again develops a high output and provides one necessary input to NG7. The other necessary input is constantly applied as long as inverters I15 and I16 remain latched. Consequently, each time a person enters a vehicle with the circuit in the key mode, he has a predetermined period of time set by the discharge of memory capacitance C1 after opening and closing the door to start the vehicle engine by actuating the ignition switch SW1.

When the operator wishes to again place the dual-mode security circuit in the security mode, he has only to employ his electronic keying circuit to cause the keyable control circuit to generate an output before opening the vehicle door. Thus, the voltage developed across resistance R22 will provide one necessary input to NAND gate NG6, the other necessary input being normally provided when door switch SW2 is closed. The output of NAND gate NG6 goes low and capacitance C9 discharges through diode D14 and resistance R25. Consequently, inverters I15 and I16 are unlatched and the output of I16 goes low. Thus, disabling transistor Q8 is returned to its non-conductive state, thereby enabling operation of lock circuit 70, and one necessary input to NAND gate NG7 is removed. The output of NG7 is held high and the output of I17 remains low as a result, even when the door is opened and the other necessary input is provided to NG7 by I13. Thus, the mode selector circuit output signal which enabled actuation of the vehicle engine within a predetermined period of time after opening and closing the vehicle door when in the key mode can no longer be generated; only the use of the electronic keying circuit can now enable engine start-up.

Mode indicator circuit 90 is arranged to provide an indication of the mode in which the security circuit is operating. Power is applied to this circuit through transistor Q9 only when door switch SW2 is closed, i.e., when the associated door is open, thereby closing a turn-on current path across the emitter-base junction of Q9 and current-limiting resistance R30 through door switch SW2 to ground. Consequently, the emitter-collector junction of Q9 is rendered conductive to apply source voltage to the high side of indicator lamps SL and KL. When the dual-mode security circuit is in the security mode, the outputs of inverters I15 and I16 are high and low, respectively. Therefore, Q10 will be rendered conductive by the application of output I15 through current-limiting resistance R28 to the base of Q10, thereby causing energizing current to flow through transistors Q9 and Q10 and indicator lamp SL connected therebetween to signify to the operator that the vehicle is in the security mode. When the dual-mode security circuit is in the key mode, the outputs of inverters I15 and I16 are low and high, respectively, thereby causing transistor Q11 to be driven conductive by the high output of I16 through current-limiting resistance R29 to the base of Q11. Thus, energizing current may now flow through the conductive transistors Q9 and Q11 and through indicator lamp KL connected therebetween to indicate that the vehicle is in the key mode. This circuit may, of course, be modified by eliminating transistor Q9 and having power applied directly to the high terminals of the indicator lamps SL and KL. However, for purposes of minimizing standby power drain, the use of power switching transistor Q9 is preferred.

Referring now specifically to FIG. 2, manually-operable master door lock switch SW3 and subordinate door lock switch SW4 are original equipment in many automotive passenger vehicles, as is the reversible motor M for controlling an associated door lock through a known system of gears. The remaining circuitry has been developed by the applicant to interface the dual-mode security circuit shown in FIG. 1 with the aforementioned standard equipment. The terminals T1 and T2 in FIG. 2 correspond to terminals T1 and T2, respectively, in FIG. 1. Thus, when a door unlock signal in the form of a positive pulse of brief duration appears at terminal T1, energizing current flows through the winding of relay RE2 and diode D16 and through the right armatures of interconnected switches SW4 and SW3 to ground, thereby causing the armature of relay RE2 to be raised against the opposing contact and energize motor M from the +12 volts DC source through the armature of energized relay RE2, and through the armature of de-energized relay RE3 to ground. Thus, motor M is caused to rotate in a first direction so as to cause the vehicle door to unlock. When a door lock signal in the form of a positive pulse of brief duration appears at terminal T2, energizing current flows through the winding of relay RE3 and diode D15 and through the left armatures of interconnected switches SW4 and SW3 to ground, thereby causing the armature of relay RE3 to be raised against the opposing contact and energize motor M to from the +12 volts DC source through the armature of energized relay RE3, and through the armature of de-energized relay RE2 to ground. Thus, the motor M is caused to rotate in a second direction so as to cause the vehicle door to lock.

In the disclosed embodiment of the present invention, the various component parts have the following values, characteristics or part numbers:

Resistances

| | |
|---|---|
| R1 | — 100K ohms |
| R2 | — 10K ohms |
| R3 | — 4.7K ohms |
| R4 | — 4.7K ohms |
| R5 | — 1.5K ohms |
| R6 | — 1K ohms |
| R7 | — 10K ohms |
| R8 | — 10K ohms |
| R9 | — 4.7M ohms |
| R10 | — 4.7K ohms |
| R11 | — 4.7K ohms |
| R12 | — 1K ohms |
| R13 | — 1M ohms |
| R14 | — 1M ohms |
| R15 | — 47K ohms |
| R16 | — 180K ohms |
| R17 | — 4.7M ohms |
| R18 | — 47K ohms |
| R19 | — 47K ohms |
| R20 | — 4.7K ohms |
| R21 | — 1K ohms |
| R22 | — 10K ohms |
| R23 | — 68K ohms |
| R24 | — 22K ohms |
| R25 | — 10K ohms |
| R26 | — 100K ohms |
| R27 | — 12K ohms |
| R28 | — 10K ohms |
| R29 | — 10K ohms |
| R30 | — 4.7K ohms |

Capacitances

| | |
|---|---|
| C1 | — 175 farads |
| C2 | — 1 farads |
| C3 | — .22 farads |
| C4 | — 1 farads |
| C5 | — 6.4 farads |
| C6 | — 6.4 farads |
| C7 | — 6.4 farads |
| C8 | — .22 farads |
| C9 | — 1 farads |
| C10 | — .1 farads |

Inverters

| | |
|---|---|
| I1 | — RCA CD4009AE |
| I2 | — RCA CD4009AE |
| I3 | — RCA CD4009AE |
| I4 | — RCA CD4009AE |
| I5 | — RCA CD4009AE |
| I6 | — RCA CD4009AE |
| I7 | — RCA CD4009AE |
| I8 | — RCA CD4009AE |
| I9 | — RCA CD4009AE |
| I10 | — RCA CD4009AE |
| I11 | — RCA CD4009AE |
| I12 | — RCA CD4009AE |
| I13 | — RCA CD4009AE |
| I14 | — RCA CD4009AE |
| I15 | — RCA CD4009AE |
| I16 | — RCA CD4009AE |
| I17 | — RCA CD4009AE |
| I18 | — RCA CD4009AE |

Transistors

| | |
|---|---|
| Q1 | — 2N3569 |
| Q2 | — 2N4888 |
| Q3 | — 2N3567 |
| Q4 | — 2N3569 |
| Q5 | — MJE371 |
| Q6 | — 2N3569 |
| Q7 | — MJE371 |
| Q8 | — 2N3569 |
| Q9 | — 2N4888 |
| Q10 | — 2N3567 |
| Q11 | — 2N3567 |

Lamps

| | |
|---|---|
| SL | — 386 |
| KL | — 386 |

NAND Gates

| | |
|---|---|
| NG1 | — RCA CD4011AE |
| NG2 | — RCA CD4011AE |
| NG3 | — RCA CD4011AE |
| NG4 | — RCA CD4011AE |
| NG5 | — RCA CD4011AE |
| NG6 | — RCA CD4011AE |
| NG7 | — RCA CD4011AE |

Diodes

| | |
|---|---|
| D1 | — 1N4148 |
| D2 | — 1N4148 |
| D3 | — 1N4148 |
| D4 | — 1N4148 |
| D5 | — 1N4148 |
| D6 | — 1N4148 |
| D7 | — 1N4148 |
| D8 | — 1N4148 |
| D9 | — 1N4148 |
| D10 | — 1N4148 |
| D11 | — 1N4148 |
| D12 | — 1N4148 |
| D13 | — 1N4148 |
| D14 | — 1N4148 |
| D15 | — 1N4148 |
| D16 | — 1N4148 |

Relays

| | |
|---|---|
| RE1 | — Line Elec. MW1D |
| RE2 | — Line Elec. MW1D |
| RE3 | — Line Elec. MW1D |

The advantages of the present invention, as well as certain changes and modifications of the disclosed embodiment thereof, will be readily apparent to those skilled in the art. For example, a more rudimentary form of the present invention may be constructed by eliminating any one or more of the following subcircuits: relock circuit 50, lock circuit 70 and mode indicator circuit 90. The essential functions of the present invention are retained without these subcircuits. In addition, the electronically-keyable control circuit and associated keying circuit may be varied from the circuitry disclosed in the cross-referenced application, or may be replaced by a switch actuable by a first mechanical key, and the ignition switch SW1 may be actuable by a second mechanical key, or without any key at all. It is the applicant's intention to cover all these and other changes and modifications which could be made to the embodiment of the invention herein chosen for the purposes of the disclosure without departing from the spirit and scope of the invention.

What is claimed is:

1. In a vehicle comprising a keyable control means operative when keyed to generate a control signal, a multi-position ignition switch having at least OFF, ON and START positions, at least one door switch, at least one door lock/unlock means, and engine starting means, the improvement comprising: dual-mode security circuit means operative in the security mode in response to said control signal (1) to actuate said at least one door lock/unlock means so as to unlock the associated door and (2) to enable energization of said engine starting means by actuation of said multi-position ignition switch to the START position within a predetermined period of time after the actuation and de-actuation of said at least one door switch, said dual-mode security circuit means being switched to the key mode of operation upon actuation of said at least one door switch and subsequent generation of said control signal, said dual-mode security circuit means being operative in the key mode to enable energization of said engine starting means by actuation of said multi-position ignition switch to the START position, said dual-mode security circuit means being switched back to the security mode by generation of said control signal.

2. The improvement according to claim 1 wherein said dual-mode security circuit means is further operative to actuate said at least one door lock/unlock means so as to relock the associated door if said at least one door switch is not actuated within a predetermined period of time from the termination of said control signal.

3. The improvement according to claim 1 wherein said dual-mode security circuit means is further operative to actuate said at least one door lock/unlock means so as to lock the associated door in response to the actuation and de-actuation of said at least one door switch.

4. The improvement according to claim 3 wherein said dual-mode security circuit means is further operative to delay the actuation of said at least one door lock/unlock means so as to lock the associated door a predetermined period of time after actuation and de-actuation of said at least one door switch.

5. The improvement according to claim 1 wherein said dual-mode security circuit means is further operative to provide first and second signals indicating operation in either the security mode or the key mode, respectively.

6. The improvement according to claim 1 wherein said keyable control means is electronically keyable, and said multi-position ignition switch is mechanically keyable.

7. The improvement according to claim 1 wherein said keyable control means is electronically keyable, and said multi-position ignition switch is actuatable without any key.

8. The improvement according to claim 1 wherein said keyable control means is mechanically keyable by means of a first key, and said multi-position ignition switch is mechanically keyable by means of a second key.

9. The improvement according to claim 1 wherein said keyable control means is mechanically keyable, and said multi-position ignition switch is actuatable without any key.

10. The improvement according to claim 1 wherein said dual-mode security circuit means comprises:
1. memory circuit means operative to receive said control signal and, in response thereto, to produce a first enabling signal for a predetermined period of time from the termination of said control signal;
2. memory latching circuit means operative to receive said first enabling signal from said memory circuit means and to produce an intermediate signal in response thereto;
3. driver circuit means operative to receive said intermediate signal and, in response thereto, to enable energization of said engine starting means by actuation of said multi-position ignition switch to the START position;
4. unlocking circuit means operative to receive said control signal and, in response thereto, to generate and apply a door unlock signal to said at least one door lock/unlock means so as to unlock the associated door;
5. ignition latching circuit means operative in response to the actuation of said multi-position ignition switch to either of the ON or START positions to generate and apply a second enabling signal to said memory latching circuit means as long as said ignition switch remains in either of the ON or START positions; and
6. mode selector circuit means operative to receive a signal from said at least one door switch and said control signal, and further operative in response to the occurrence of said door switch and control signals in that order to switch said dual-mode security circuit means to the key mode of operation, said mode selector circuit means then being operative to generate and apply a third enabling signal to said memory latching circuit means each time said at least one door switch is actuated, and being further operative to receive said control signal and, in response thereto, to switch said dual-mode security circuit means to the security mode.

11. The improvement according to claim 10 wherein said dual-mode security circuit means further comprises locking circuit means operative in response to the actuation and de-actuation of said at least one door switch to generate and apply a door lock signal to said at least one door lock/unlock means so as to lock the associated door.

12. The improvement according to claim 11 wherein said locking circuit means is further operative to delay the actuation of said at least one door lock/unlock means so as to lock the associated door a predetermined period of time after actuation and de-actuation of said at least one door switch.

13. The improvement according to claim 11 wherein said mode selector circuit means is further operative, when said dual-mode security circuit means is in the key mode, to generate and apply a disabling signal to said locking circuit means which, in response thereto, is disabled from generating a door lock signal.

14. The improvement according to claim 11 wherein said dual-mode security circuit means further comprises relock circuit means operative to receive a priming signal from said driver circuit means and operative upon termination of said priming signal to generate and apply a relock signal to said locking circuit means which, in response thereto, is operative to generate and apply a door lock signal to said at least one door lock/unlock means so as to relock the associated door if said at least one door switch is not actuated within a predetermined period of time from the termination of said control signal.

15. The improvement according to claim 14 wherein said locking circuit means is further operative to generate and apply a latching signal to said relock circuit means to prevent said relock circuit means from generating said relock signal when said locking circuit means is generating said door lock signal in response to actuation and de-actuation of said at least one door switch.

16. The improvement according to claim 10 wherein said dual-mode security circuit means further comprises mode indicator circuit means operative to receive first and second mode signals from said mode selector circuit means and, in response thereto, to provide first and second signals indicating operation in either the key mode or the security mode, respectively.

17. The improvement according to claim 16 wherein energization of said mode indicator circuit means is controlled by said at least one door switch, said mode indicator circuit means being energized when said at least one door switch is actuated and de-energized when said at least one door switch is de-actuated.

18. The improvement according to claim 10 wherein said memory circuit means comprises a resistance and a capacitance connected in parallel with one another and in series through a diode to said keyable control means to receive the control signal therefrom, said first enabling signal being developed across said capacitance.

19. The improvement according to claim 10 wherein said memory latching circuit means comprises:
 1 first and second inverters connected in series with one another between the output of said memory circuit means and the input to said driver circuit means;
 2 a NAND gate having one input connected to the output of said second inverter and the other input connected to receive a signal generated by said mode selector circuit means in response to the actuation of said at least one door switch; and
 3 a third inverter connected between the output of said first NAND gate and through a diode to the input of said first inverter.

20. The improvement according to claim 10 wherein said driver circuit means comprises:
 1 a first transistor coupled to and controlled by the output of said memory latching circuit means;
 2 a second transistor having its turn-on current path controlled by said first transistor; and
 3 a third transistor having its turn-on current path controlled by said second transistor, and operative when rendered conductive to enable energization of said engine starting means by actuation of said multi-position ignition switch to the START position.

21. The improvement according to claim 10 wherein said unlocking circuit means comprises:
 1 a first inverter coupled to said keyable control means to receive said control signal therefrom;
 2 a resistance and a capacitance connected in series between a source of power and the output of said first inverter;
 3 a second inverter having its input connected to the junction of said resistance and said capacitance; and
 4 driver circuit means connected to and controlled by the output of said second inverter, said driver circuit means being operative to generate said door unlock signal when the output of said second inverter is high.

22. The improvement according to claim 21 wherein said capacitance is normally charged, and is discharged when the output of said first inverter goes low in response to said control signal, and is recharged through said resistance after the output of said first inverter again goes high, the low output of said first inverter being effectively transmitted through said discharged capacitance to the input of said second inverter so that the output of said second inverter goes high until said capacitance is recharged to a level above the input threshold of said second inverter.

23. The improvement according to claim 10 wherein said ignition latching circuit means comprises:
 1 a voltage divider comprising first and second resistances connected in series from the ON terminal of said multi-position ignition switch to ground;
 2 a NAND gate having a first input connected through a first diode to the junction of said first and second resistances and the second input coupled to said at least one door switch; and
 3 an inverter and a second diode connected in series from the output of said NAND gate to said first input of said NAND gate and to said memory latching circuit means, said second enabling signal being developed at one terminal of said second diode.

24. The improvement according to claim 23 wherein said ignition latching circuit means further comprises a filtering network comprising a third resistance and a capacitance connected in parallel with one another between said first input of said NAND gate and ground.

25. The improvement according to claim 10 wherein said mode selector circuit means comprises:
 1 a voltage divider comprising first and second resistances connected in series with one another and in parallel with said at least one door switch;
 2 a first inverter having its input connected to the junction of said first and second resistances;
 3 latching/unlatching circuit means operative to receive said control signal, said door switch signal in the form of the voltage developed at the junction of said first and second resistances, and the output of said first inverter, and further operative in response to the occurrence of said door switch and control signals in that order to generate a high output which is latched on after the termination of said door switch and control signals, and being further operative to receive said control signal and, in response thereto, to unlatch said high output and generate a low output; and
 4 output means operative in response to the high output of said first inverter and the high output of said latching/unlatching circuit means to generate and apply said third enabling signal to said memory latching circuit means.

26. The improvement according to claim 25 wherein said output means comprises:
 1 a NAND gate having a first input connected to the output of said latching/unlatching circuit means and a second input connected to the output of said first inverter; and
 2 a second inverter having its input connected to the output of said NAND gate, said third enabling signal being developed at the output of said second inverter when the output of said NAND gate is low.

27. The improvement according to claim 11 wherein said locking circuit means comprises:
 1 a first resistance and a first capacitance connected in series with one another across the terminal of a source of power;
 2 a first inverter having its input connected to the junction of said first resistance and said first capacitance and through a diode to the high side of said at least one door switch;
 3 a second resistance and a second capacitance connected in series between a source of power and the output terminal of said first inverter;
 4 a second inverter having its input connected to the junction of said second resistance and said second capacitance; and
 5 driver circuit means coupled to and controlled by the output of said second inverter, and being operative to generate said door lock signal in response to a high output from said second inverter.

28. The improvement according to claim 27 wherein said first and second capacitances are normally charged, and said first capacitance is discharged through said diode upon actuation of said at least one door switch, in response to which the output of said first inverter goes high, effectively discharging said second capacitance, said first capacitance being recharged through said first resistance upon de-actuation of said at least one door switch, the output of said first inverter being driven low after said first capacitance has recharged to a voltage above the input threshold of said first inverter, the low output of said first inverter being applied through said discharged second capacitance to the input of said second inverter to cause the output of said second inverter to go low until said second capacitance has recharged to a voltage above the input threshold of said second inverter.

29. The improvement according to claim 14 wherein said relock circuit means comprises:
1 a first inverter connected to said driver circuit means to receive said priming signal therefrom;
2 a second inverter having its input connected to the output of said first inverter;
3 a first resistance and a first capacitance connected in series between a source of power and the output of said second inverter;
4 a third inverter having its input connected to the junction of said first resistance and said first capacitance;
5 a first NAND gate having a first input connected to the output of said third inverter;
6 a fourth inverter having its input connected to the output of said first NAND gate and operative to generate said relock signal in response to a low output from said first NAND gate; and
7 disabling circuit means operative to receive said priming signal and a latching signal from said locking circuit means, and further operative in response thereto to generate a second input to said first NAND gate to prevent the generation of said relock signal.

30. The improvement according to claim 29 wherein said disabling circuit means comprises:
1 a second NAND gate having its output connected to said second input of said first NAND gate;
2 a fifth inverter having its input connected to the output of said second NAND gate, and having its output coupled to a first input of said second NAND gate;
3 a second resistance and a second capacitance connected in parallel with one another from a second input of said second NAND gate, said second capacitance being operative to receive said priming signal; and
4 coupling circuit means operative to transmit said latching signal from said locking circuit means to said first input of said second NAND gate.

31. The improvement according to claim 30 wherein the period of time required for the discharge of said second capacitance through said second resistance to a level below the input threshold of said second NAND gate is greater than the period of time required for the recharging of said first capacitance through said first resistance to a level above the input threshold of said third inverter after the output of said second inverter goes high and low.

32. A dual-mode control circuit comprising:
1 enabling circuit means operative to receive a control signal and, in response thereto, to enable energization of a load for a predetermined period of time after termination of said control signal;
2 latching circuit means operative in response to the energization of a load to generate and apply an enabling signal to said enabling circuit means as long as the load remains energized; and
3 mode selector circuit means operative to receive a predetermined input signal and said control signal, and further operative in response to the occurrence of said predetermined input and control signals in that order to switch said dual-mode control circuit to a first mode of operation, said mode selector circuit means then being operative to generate and apply an enabling signal to said enabling circuit means each time said predetermined input signal is received, and being further operative to receive said control signal and, in response thereto, to switch said dual-mode control circuit to a second mode of operation in which said mode selector circuit means is disabled from generating and applying said enabling signal to said enabling circuit means in response to said predetermined input signal.

* * * * *